(12) United States Patent
Appenzeller et al.

(10) Patent No.: US 7,424,614 B2
(45) Date of Patent: Sep. 9, 2008

(54) IDENTITY-BASED ENCRYPTION SYSTEM

(75) Inventors: Guido Appenzeller, Menlo Park, CA (US); Matthew J. Pauker, Menlo Park, CA (US); Rishi R. Kacker, Menlo Park, CA (US)

(73) Assignee: Voltage Security, Inc., Palo Alto, CA (US)

( * ) Notice: Subject to any disclaimer, the term of this patent is extended or adjusted under 35 U.S.C. 154(b) by 748 days.

(21) Appl. No.: 11/043,807

(22) Filed: Jan. 25, 2005

(65) Prior Publication Data
US 2008/0148047 A1    Jun. 19, 2008

Related U.S. Application Data

(63) Continuation of application No. 10/298,991, filed on Nov. 14, 2002, now Pat. No. 6,886,096.

(51) Int. Cl.
*H04L 9/00* (2006.01)
(52) U.S. Cl. .................. 713/170; 713/182; 713/168
(58) Field of Classification Search .............. 713/170, 713/182, 168
See application file for complete search history.

(56) References Cited

U.S. PATENT DOCUMENTS

| | | | |
|---|---|---|---|
| 5,016,276 A | 5/1991 | Matumoto et al. | |
| 5,159,632 A | 10/1992 | Crandall | |
| 5,271,061 A | 12/1993 | Crandall | |
| 5,272,755 A | 12/1993 | Miyaji et al. | |
| 5,581,616 A | 12/1996 | Crandall | |
| 5,715,403 A | 2/1998 | Stefik | |
| 6,061,448 A | 5/2000 | Smith et al. | |
| 6,236,971 B1 | 5/2001 | Stefik | |
| 6,816,970 B2 | 11/2004 | Morgan et al. | |
| 6,823,457 B1 | 11/2004 | Berstis et al. | |
| 6,826,689 B1 | 11/2004 | Hou | |
| 2002/0076042 A1 | 6/2002 | Sandhu et al. | |

OTHER PUBLICATIONS

U.S. Appl. No. 10/607,195, filed Jun. 25, 2003, Appenzeller et al.
http:/www.sei.cmu.edu/str/descriptions/publickey_body.html.

(Continued)

*Primary Examiner*—David Jung
(74) *Attorney, Agent, or Firm*—Treyz Law Group; G. Victor Treyz

(57) ABSTRACT

A system is provided that uses identity-based encryption to support secure communications. Messages from a sender to a receiver may be encrypted using the receiver's identity and public parameters that have been generated by a private key generator associated with the receiver. The private key generator associated with the receiver generates a private key for the receiver. The encrypted message may be decrypted by the receiver using the receiver's private key. The system may have multiple private key generators, each with a separate set of public parameters. Directory services may be used to provide a sender that is associated with one private key generator with appropriate public parameters to use when encrypting messages for a receiver that is associated with a different private key generator. A certification authority may be used to sign directory entries for the directory service. A clearinghouse may be used to avoid duplicative directory entries.

8 Claims, 10 Drawing Sheets

OTHER PUBLICATIONS

Mont et al. "The HP Time Vault Service: Innovating the Way Confidential Information is Disclosed, at the Right Time," Hewlett-Packard Company, Sep. 2002.

Atkins et al. "PGP Message Exchange Formats," International Request for Comments (Aug. 1996).

Boneh et al. "Identity-Based Encryption from the Weil Pairing," from Crypto '2001 (Oct. 2002).

Cocks, Clifford, "An Identity Based Encryption Scheme Based on Quadratic Residues," (2001).

Horwitz et al. "Toward Hierarchical Identity-Based Encryption," Proceedings of EUROCRYPT 2002 (Apr. 28, 2002-May 2, 2002) Lecture-Notes in Computer Science, Stanford University.

Housley et al., "Internet X.509 Public Key Infrastructure Certificate and CRL Profile," Standards Track Request for Comments (Jan. 1999).

Xuejia Lai et al., "A Proposal for a New Block Encryption Standard," Advances in Cryptology—EUROCRYPT 1990 Proceedings, Springer Verlag: pp. 389-404 (1991).

Rivest et al. "A Method for Obtaining Digital Signatures and Public-Key Cryptosystems," from The Communications of the ACM (Feb. 1978).

IDENTITY-BASED ENCRYPTION SYSTEM

This application is a continuation of patent application Ser. No. 10/298,991, filed Nov. 14, 2002 now U.S. Pat. No. 6,886,096, which is hereby incorporated by reference herein in its entirety.

BACKGROUND OF THE INVENTION

This invention relates to encryption, and more particularly, to identity-based encryption schemes.

Cryptographic systems are used to provide secure communications services such as secure email services and secure web browsing.

With symmetric key cryptographic systems, the sender of a message uses the same key to encrypt the message that the receiver of the message uses to decrypt the message. Symmetric-key systems require that each sender and receiver exchange a shared key in a secure manner.

With public-key cryptographic systems, two types of keys are used—public keys and private keys. Senders may encrypt messages using the public keys of the receivers. Each receiver has a private key that is used to decrypt the messages for that receiver.

One public cryptographic system that is in use is the RSA cryptographic system. Each user in this system has a unique public key and a unique private key. A sender using the system may obtain the public key of a given receiver from a key server connected to the Internet. To ensure the authenticity of the public key and thereby defeat possible man-in-the-middle attacks, the public key may be provided to the sender with a certificate signed by a trusted certificate authority. The certificate may be used to verify that the public key belongs to the intended recipient of the sender's message.

To allow an organization to revoke the secure email privileges of an employee when the employee no longer works for the organization, some organizations may arrange to have the public keys of all of their employees automatically expire at the end of each day. New public keys for the current employees may be generated each day. The new public keys may be made publicly available by placing them on a public key server.

Because encryption using public-key encryption algorithms is computationally intensive, some systems allow users to use public-key encryption to securely exchange a shared symmetric key. The symmetric key may then be used to support a secure communication session.

With public key encryption systems, a sender must obtain the public key of a message recipient before the sender can encrypt a message. A sender may be traveling with a portable computer and may desire to respond to an email message that has been temporarily stored on the computer. If the sender does not already have a copy of the public key of the person who sent the message, the sender must obtain that public key from a public key server. However, the sender's portable computer may not be on-line when the sender desires to compose the response to the email. The sender will therefore not be able to access an on-line public key server and may be unable to encrypt the message as soon as it is composed. Because the sender's computer may be at risk of being stolen, the unencrypted message on the computer may be susceptible to interception.

Identity-based encryption schemes work differently than public-key systems. With an identity-based encryption system, senders and receivers communicate securely using public parameters and private keys. Each user has a unique private key based on the user's identity for decrypting messages, but a single set of public parameters (used during the encryption and decryption processes) may be shared by many users.

With one suitable arrangement, a user's email address or a user's email address concatenated with a date stamp may be used to identify each user. With this approach, senders who are currently off-line and who would therefore be unable to access a public key server, may still immediately encrypt sensitive messages if they have access to the public parameters of the user. Because all of the users in an organization may share the same set of public parameters, senders may often have access to the correct public parameters to use for a given recipient, even if the sender has never communicated with that receiver before. When network access is available, the encrypted message may be transmitted to the receiver. Receivers can decrypt messages using their private keys.

In an identity-based cryptographic system, private keys may be generated by a private key generator. The private key generator uses secret information (i.e., a so-called "master secret") as an input when generating the private keys. The security of the system rests on the ability of the organization holding the master secret to maintain its secrecy.

Because of the importance of maintaining the secrecy of the master secret in identity-based cryptographic systems, certain organizations may be unwilling to entrust custodial responsibility for the master secret to third parties. However, if multiple organizations run separate identity-based encryption systems with different master secrets, it may be difficult for users associated with different organizations to communicate with each other.

SUMMARY OF THE INVENTION

In accordance with the present invention, an identity-based encryption system is provided having multiple private key generators. Each private key generator may have a different master secret and may generate unique private keys for each of a plurality of associated users. Each private key generator may also generate a set of public parameters that can be used when encrypting messages destined to a receiver that is among the users associated with that private key generator.

A directory service may be used to provide users of the system with access to information that maps or associates particular groups of users with particular sets of public parameters. A sender who desires public parameter information for a given receiver or organization may consult the directory service.

If desired, the system may have multiple directory services, each of which maintains a directory of user information and associated public parameter information. A clearinghouse service may be used to prevent duplication among the entries in these directories.

Users identities may be based on email addresses. When this type of approach is used, senders may look up public parameter information in the directories using the email address information (e.g., using the domain name portion of a given receiver's email address or using a receiver's entire email address).

If the directory services are trusted, users can obtain public parameter information from the directory services over a secure communications link (e.g., using the secure sockets layer protocol). If the directory services are not trusted (e.g., because they are operated by unknown third parties), a certificate authority may be used to sign directory entries. Users can then verify the directory entries.

In configurations in which directory services are trusted, each private key generator may provide directory information (e.g., information on the domain names associated with that private key generator and related information on the set of public parameters associated with that private key generator) to the directory services over a secure communications link. In configurations in which directory services are not trusted, the private key generators may provide directory information to the directory services through the certification authority. The authenticity of the private key generator's directory information may be verified (by the trusted directory service or by the certification authority) before this information is published for access by users.

If desired, the unique private keys of the users can be made to expire automatically. With one suitable approach, each user's identity may be made up of a time stamp concatenated with that user's email address. The privileges of a given user may be revoked by the private key generator, by refusing to generate more private keys for that given user, while continuing to generate private keys for other users.

In a system with private keys that expire on a regular basis (e.g., once per week), users will generally desire to update their private keys at the same frequency (e.g., once per week). During the weekly interchange with the user's private key generator to obtain the current version of their private key, a user may obtain updated public parameter directory information for other identity-based encryption system users. This directory information may be provided to the user by the user's private key generator at the same time that the current private key information is provided. The private key generator may obtain the directory information from a directory service, from other private key generators, from a clearinghouse (e.g., in environments in which there are multiple directory services), from a certification authority (e.g., a certification authority that is generating certificates for private key generators), or from any other suitable entity in the system. Public parameter directory information may also be exchanged between users through a peer-to-peer arrangement. For example, public parameter information may be exchanged using email.

Further features of the invention, its nature and various advantages will be more apparent from the accompanying drawings and the following detailed description of the preferred embodiments.

DETAILED DESCRIPTION OF THE PREFERRED EMBODIMENTS

Figure 1:
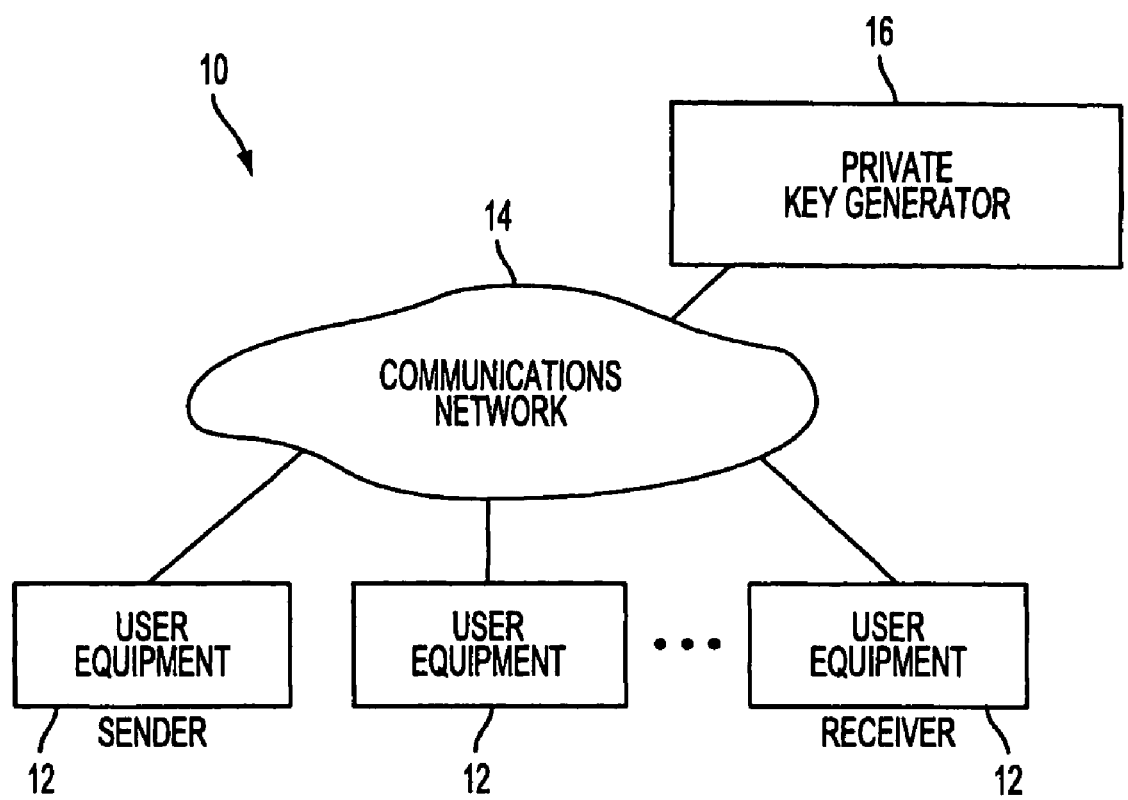
FIG. 1 is a diagram of an illustrative identity-based encryption system in accordance with the present invention.

A portion of an illustrative identity-based cryptographic system 10 in accordance with the present invention is shown in FIG. 1. System 10 allows users at various locations to communicate securely using an identity-based encryption scheme. The users in the system may be individuals, organizations, or any other suitable parties or entities. Users may communicate with each other using user equipment devices 12. Equipment 12 may, for example, include computing equipment such as a personal computers, portable computers, mainframe computers, networked computers or terminals, telecommunications equipment, handheld computers or personal digital assistants, or cellular telephones. Multiple users may use the same device. For example, a group of users may share the use of a single computer terminal that is connected to a host computer in a local area network. These are merely illustrative examples of the type of platforms that the users of system 10 may use. User equipment 12 may be based on any suitable electronic equipment if desired.

The user equipment devices may be interconnected by a communications network 14. Network 14 may be, for example, the Internet, a local area network, a wide area network, the public switched telephone network, a virtual private network, a wired network, a wireless network, dedicated leased lines, a network based on fiber-optic or cable paths or other wired or wireless paths, or a network formed using any other suitable network technology or a combination of such networks.

Various computing devices may be connected to network 14 to support the features of the identity-based encryption scheme. For example, computing equipment at a private key generator 16 may be used to distribute private keys. In some arrangements, such computing equipment may be used to provide the functions of a server in a client-server architecture. For clarity, the present invention will sometimes be described in the context of such server-based arrangements. This is, however, merely illustrative. Any suitable computing device arrangement may be used to distribute private keys and other information for supporting encrypted communications in system 10 if desired. A typical server-based arrangement may use one or more computers to provide the functions of a server. A server may be formed using a single computer or multiple computers. If desired, the functions of a single server may be provided by computers that are distributed over a number of different physical locations.

Private key generator 16 may be based on a suitable computing platform such as a server-based platform that is connected to communications network 14. If desired, the key generation functions of private key generator 16 may be divided among multiple computers at one or more locations (each of which may have only part of the secret information needed to generate the private keys). For clarity, the present discussion will focus primarily on private key generator arrangements in which each private key generator 16 individually generates its own private keys for its own associated users.

Some user activities, such as sending person-to-person email messages, require manual intervention. For example, a person who desires to send such a message must compose the message before it is encrypted and sent to the appropriate recipient.

Other user activities in system 10 may be automated or semiautomated. These user activities may take place with little or no manual intervention. As just one example, the user at one device 12 may be a banking institution that desires to use encrypted communications to deliver encrypted bank statements to account holders at other devices 12 over communications networks 14. The distribution process may be automated so that no operator intervention will generally be needed at the banking institution's equipment once the system has been properly set up. User receipt of the statements may also be automated.

Identity-based encryption schemes can be implemented using a number of different cryptographic algorithms. One such scheme is based on quadratic residues (see, e.g., "An Identity Based Encryption Scheme Based on Quadratic Residues," Eighth IMA International Conference on Cryptography and Coding, December 2001, Royal Agricultural College, Cirencester, UK, by Clifford Cocks). Another suitable scheme is based on elliptic curves (see, e.g., "Identity-Based Encryption from the Weil Pairing," by Dan Boneh and Matthew Franklin, extended abstract in Advances in Cryptology—Crypto 2001, Lecture Notes in Computer Science, Vol. 2139, Springer-Verlag, pp. 231-229, August 2001. See also http://eprint.iacr.org/2001/090 by Dan Boneh and Matthew Franklin). For clarity, aspects of the present invention will sometimes be described in the context of an identity-based encryption scheme such as the elliptic curve implementation described by Boneh et al. This is, however, merely illustrative. Any suitable approach for identity-based encryption may be used with system 10 if desired.

Figure 2:
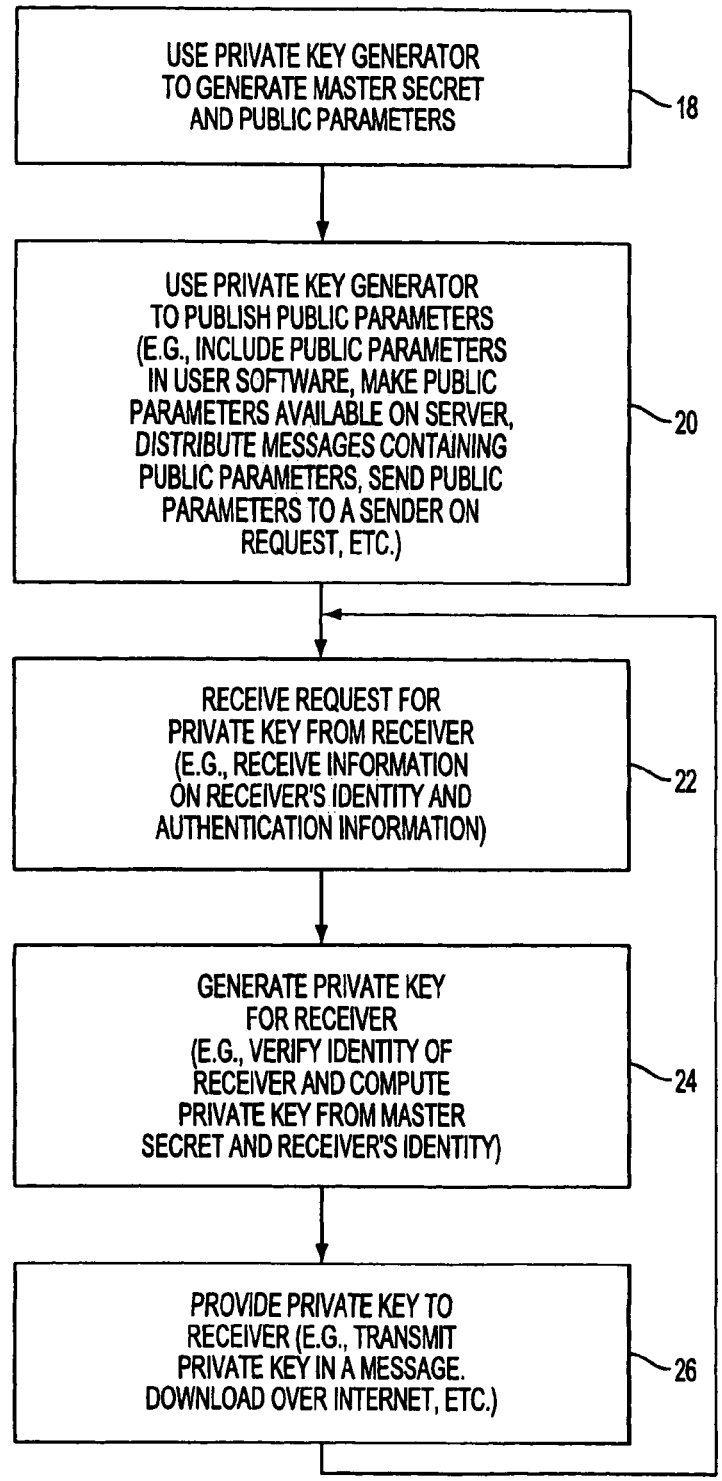
FIG. 2 is a flow chart of illustrative steps involved in using the private key generator of the system of FIG. 1 in accordance with the present invention.
Figure 3:
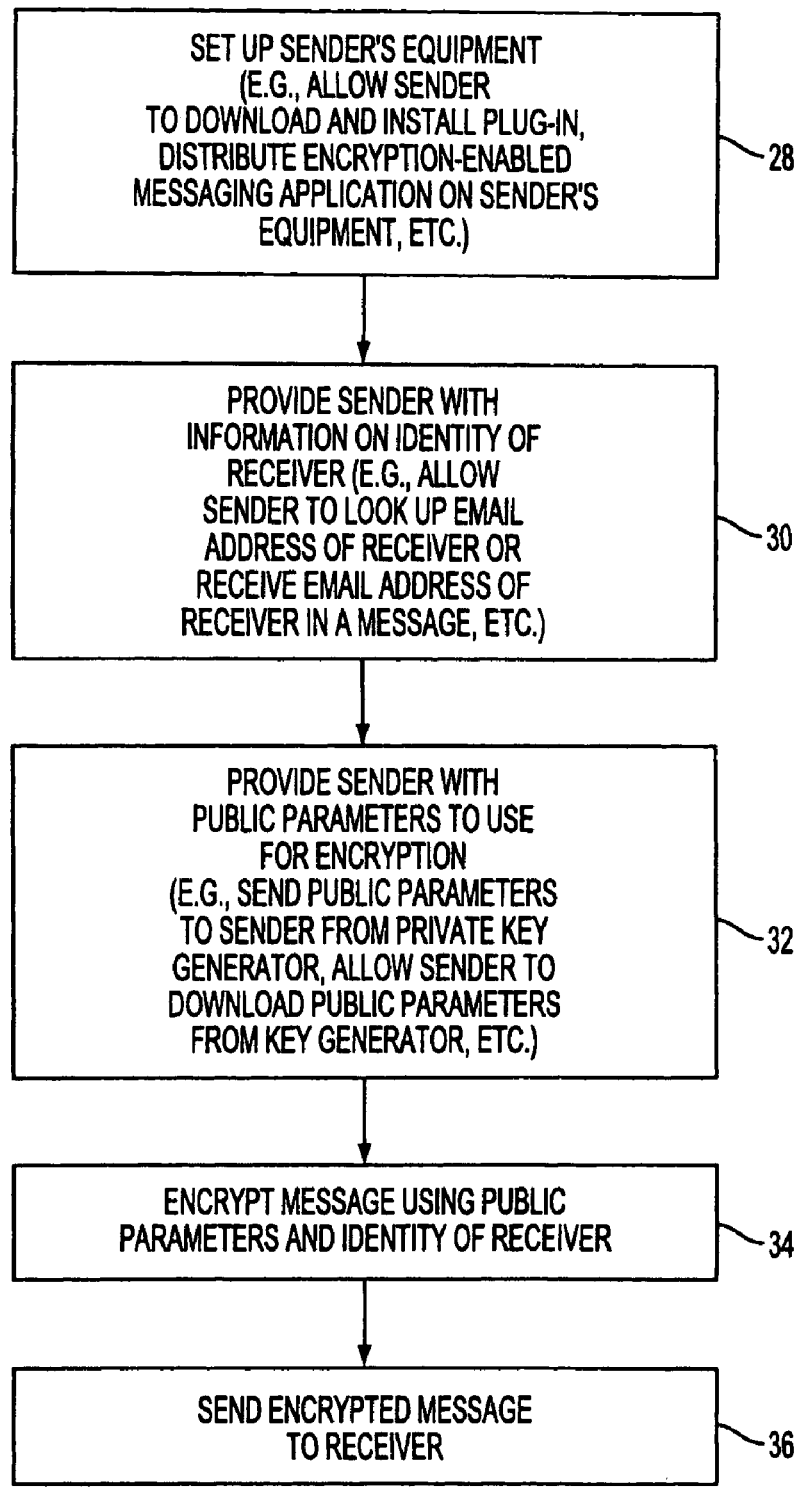
FIG. 3 is a flow chart of illustrative steps involved in allowing a sender in the system of FIG. 1 to encrypt a message for a receiver in accordance with the present invention.
Figure 4:
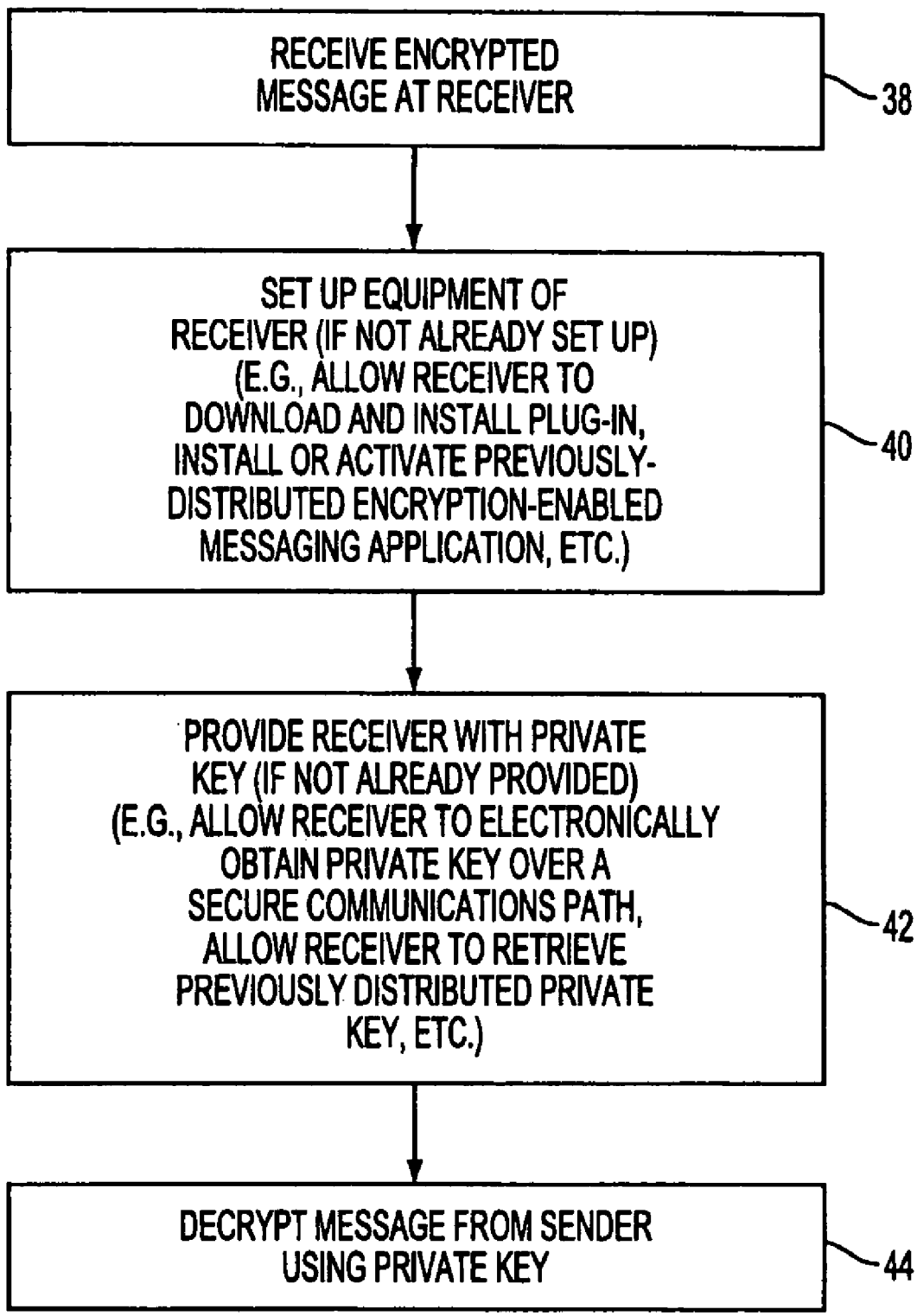
FIG. 4 is a flow chart of illustrative steps involved in allowing a receiver in the system of FIG. 1 to decrypt a message from a sender in accordance with the present invention.

Steps involved in using an identity-based cryptographic scheme with the equipment of FIG. 1 to send a message from a sender at one device 12 to a receiver at another device 12 are shown in FIGS. 2, 3, and 4. The message that is being sent may be any digital information (e.g., text, graphics, audio, video, commands, executable code, data, etc.) that is to be electronically conveyed in a secure manner.

At step 18 of FIG. 2, private key generator 16 of FIG. 1 obtains a master secret s. For example, the private key generator may create a master secret from a number that is randomly generated at the private key generator by a processor housed inside a tamper-proof enclosure. The master secret may also be produced off-site and delivered to the private key generator 16. The master secret (also sometimes referred to as a secret master key or a master key) is secret information that will subsequently be used by the private key generator 16 to generate private keys for receivers in the system to use in decrypting messages and to generate public parameter information for use by senders in encrypting messages.

During step 18, the private key generator may generate the public parameters. For example, the private key generator 16 may obtain or generate a public parameter P. Using a mathematical function appropriate for the specific type of identity-based encryption being used, and using the values of the master secret s and public parameter P as inputs, the private key generator may also generate a corresponding public parameter sP.

The parameters P and sP may be numbers. In general, there is an equivalency between numbers, letters, symbols, and other such schemes for representing information. Sometimes certain information (e.g., the master secret or public parameters) will be described as being in number form and sometimes certain information (e.g., a user's identity) may be described as being at least partly in character form (e.g., in the form of an email address). Because of the inherent equivalency between these different representational schemes, the techniques involved in converting letters or symbols into numbers or for representing multiple numbers or strings as a single number or other such operations are not described in detail herein.

At step 20, the private key generator may publish the public parameters P and sP. For example, these parameters may be made available over the communications network 14 using computing equipment (e.g., a server) at private key generator 16. The public parameters may be sent to users via email. If desired, the public parameters may be provided to users on demand (e.g., by downloading from a server, in the form of a message, or using any other suitable arrangement). Parameters P and sP may be distributed as part of a downloadable or preinstalled software module or package. For example, P and sP may be incorporated into an email application, web browser, or other communications or Internet application that is distributed with the user's personal computer or other user equipment 12 or that is downloaded (e.g., in the form of a plug-in or stand-alone package) at a later time.

Parameters P and sP may be distributed together or separately. If parameters P and sP are distributed separately, each parameter may be distributed using a different distribution mechanism. For example, P may be built into the user's software and sP may be distributed over the Internet. Moreover, P and sP may be combined to form the equivalent of a single number or parameter (still referred to herein using the plural form "parameters" for clarity and convenience) or may be subdivided (e.g., to form three or more public parameter sub-parts). If desired public parameters P and sP may be distributed manually (e.g., by printed mail or by distributing a diskette or other computer-readable media to the user). These are merely illustrative examples. Any suitable technique may be used to publish the public parameters P and sP if desired.

Once the public parameters P and sP have been provided to a user (i.e., a sender) who desires to send an encrypted message to another user (i.e., a receiver), the sender may encrypt and send the message to the receiver. When the receiver receives the encrypted message, or earlier, when the receiver sets up or updates the equipment at the receiver's location, the receiver obtains the receiver's private key from the private key generator.

The private key generator may generate private keys for each of the multiple users associated with that private key generator based on the identities of each of these users. The identity of a user may be represented by any suitable string, number, or symbol. For example, the identity of a message recipient may be represented by that user's email address, name, or social security number. The user's privileges may be made to automatically expire in system 10 by automatically concatenating the current time (e.g., the current day of the year and year, the current month, or any other suitable time-related date-stamp information) with the user's email address. Other information (e.g., credentials such as a security clearance) may also be combined with the user's email address or other identity to provide enhanced cryptographic services. For clarity, the user's identity will be represented herein as the number Q. A suitable mathematical function may be used to determine the value of Q suitable for use as an input to the private key generation algorithm from a string representation of the user's identity such as the user's email address or the user's email address concatenated with other information.

If a private key is requested by the receiver (as opposed, e.g., to being automatically distributed), such a request may be received by the private key generator 16 at step 22 of FIG. 2. The receiver's identity Q (or an equivalent precursor of Q) and authentication information that may be used to authenticate the receiver may be received at step 22.

At step 24, the private key generator may generate a private key for the receiver. For example, the private key for the receiver may be generated from the receiver's identity Q and the master secret s by using an appropriate mathematical function to calculate the value of sQ. The receiver's identity may be verified using the authentication information from the receiver before the private key is issued to the receiver.

Any suitable manual or automatic authentication technique may be used. For example, the receiver may be asked to fax or mail a letter to the private key generator 16 on the receiver's official letterhead, which is examined for authenticity by personnel or automated equipment at the private key generator. As another example, biometric identification techniques (e.g., fingerprint analysis, eye-scanning, handprint or voice-print analysis, facial recognition methods, or in-person identification checks) may be used. When the authentication process involves electronic communications between the receiver and the private key generator, the communications path between the receiver and the private key generator should be secure. The communications path may be assumed to be secure if it is not available for use by untrusted parties. For example, the network between the private key generator 16 and the receiver may be a private line that is controlled by the private key generator or another trusted authority. As another example, a secure channel may be supported using a secure web browser link (e.g., using the secure sockets layer protocol).

Regardless of how the private key generator 16 authenticates the identity of the receiver and generates the receiver's private key at step 24, the private key may be provided to the receiver at step 26. For example, the private key may be transmitted to the receiver in an email or other suitable message, may be made available for downloading over the Internet (as part of a stand-alone downloadable application or a downloadable plug-in module, as a stand-alone key, etc.). A secure communications channel may be used for electronic communications between the private key generator 16 and the receiver's equipment 12. If desired, the private key may be preinstalled on the receiver's equipment, so that the private key will be available for the receiver when the receiver first uses the equipment. The private key may also be distributed by mail or courier (e.g., on a computer-readable medium such as a computer disk or memory chip). These are merely illustrative techniques for providing the private key of the receiver to the receiver. Any suitable technique may be used if desired. Batch processing may be used to process lists of receivers in bulk.

After the private key generator provides the private key to the receiver at step 26, control loops back to step 22, so that the private key generator 16 may receive additional requests for private keys from other receivers (or so that the next step in an automated batch processing function may be performed, etc.).

Steps involved in setting up and using the equipment of a sender to send encrypted messages to a receiver are shown in FIG. 3. At step 28, a sender's equipment 12 may be set up (e.g., appropriate stand-alone or plug-in software may be downloaded onto equipment 12 over network 12 or previously installed software may be activated or run).

At step 30, the sender may be provided with information on the identity of the receiver Q. For example, the sender may obtain the receiver's email address (e.g., electronically in a message or by browsing a web site or directory, over the phone, from a written document, etc.). If desired, the sender's equipment may use an appropriate mathematical function to convert the string information in the receiver's email address into an appropriate value of Q. Both the email address (or the email address concatenated with a time stamp or other information to provide additional cryptographic functions) and the value of Q are referred to herein as the receiver's identity.

At step 32, the sender can be provided with the public parameters P and sP. For example, the values of P and SP may be provided in an email application or an email plug-in or other software that is distributed to the sender or preinstalled on the sender's equipment. The values of P and sP may also be downloaded from the private key generator 16 over communications network 14 (e.g., using a web interface). The values of P and sP may, if desired, be distributed from the private key generator 16 using email or other suitable messaging formats. The values of P and sP may be provided to the sender according to a schedule, when certain events occur, or when requested by the sender (i.e., on demand). The sender may be provided with P and sP together or separately. For example, P may be embedded in the sender's software and sP may be downloaded when the sender sets up the device 12 for the first time. These are merely illustrative techniques for providing the public parameter information for the identity-based encryption system to senders. Any suitable technique for providing this information to senders may be used if desired.

At step 34, the sender's equipment 12 may be used by the sender to compose or create a message and to encrypt that message for transmission to the receiver over network 14. The equipment 12 may, for example, be used to run an email program or other suitable software in which the identity-based encryption algorithm has been incorporated (or added using a plug-in). As another example, identity-based encryption functions may be provided using the operating system of the user equipment device. Messages to be transmitted may also be encrypted using a stand-alone encryption algorithm. Other suitable arrangements may be used if desired.

Regardless of the technique that is used for encrypting the message, the message is preferably encrypted using an identity-based scheme. The values of P, sP, and Q are used as inputs to the identity-based encryption algorithm running on the sender's equipment.

The algorithm may also use a random number generation function to generate a random number r. This random number may be considered to be part of the identity-based encryption program or may be considered to be an input to that program. The random number may be mathematically combined with the receiver's identity Q and the resulting value of rQ may be used as one of the encryption engine's inputs. The same random number may also be mathematically combined with the public parameter P to calculate rP. The values of rQ (the sender's identity) and rP (a randomized version of one of the public parameters) may be used by the identity-based encryption engine at the sender to encrypt the message to be sent to the receiver. The value of rP may be sent to the receiver by the sender as part of the encrypted message or separately. At the receiver, the values of rP and rQ may be used by the receiver's identity-based decryption engine to decrypt the encrypted message.

The encrypted message may be sent to the receiver at step 36. For example, the encrypted message may be sent by the sender using the sender's email application. The value of rP may be included in the email message or may be sent to the receiver separately. The message may be carried over the communications network 14 and may be received by the user equipment 12 of the receiver (e.g., using the receiver's email application).

Illustrative steps involved in setting up and using the equipment of the receiver to receive and decrypt the message of the sender are shown in FIG. 4. At step 38, the receiver's email application or other software running on the receiver's equipment 12 may be used to receive the encrypted message from the sender.

The receiver's equipment may be set up to perform identity-based decryption operations at any suitable time. For example, identity-based decryption engine software may be preinstalled on the receiver's equipment and distributed to the receiver when the receiver obtains the equipment. The receiver may also download and install appropriate stand-alone or plug in software. If the receiver's equipment has not already been set up for decryption operations, the equipment may be set up at step 40. For example, appropriate software may be installed from a computer readable medium such as a computer disk or memory chip or may be downloaded from a server over the Internet. Previously installed software may also be activated.

At step 42, the receiver may be provided with the private key sQ (if the receiver has not already been provided with the private key during an earlier operation). The private key may, for example, be downloaded or sent to the receiver's equipment at step 42 from the private key generator 16. The private key may be transmitted over a secure communications channel over network 14.

Any suitable technique may be used to ensure that the communications path between the private key generator and the receiver is secure. For example, the private key generator and receiver may use the secure sockets layer protocol to ensure that communications are secure. The receiver may also physically obtain the key (e.g., via courier or mail on a computer disk). The receiver may request that the private key be provided to the receiver and may receive the private key from the private key generator using secure email communications (e.g., using public key encryption techniques).

The private key generator 16 preferably authenticates the receiver's identity before the private key for the receiver is released at step 42. Any suitable authentication technique may be used. For example, the receiver may communicate with the private key generator over a trusted communications path (e.g., dedicated or trusted lines), the receiver may provide a letterhead or biometric information to the private key generator. This information may be provided electronically (e.g., over a secure path), in person, etc. Once the private key generator 16 verifies the receiver's identity, the private key generator 16 may provide the private key sQ to the receiver at step 42.

After the receiver has received the private key sQ from the private key generator and has received the encrypted message and the randomized public parameter rP from the sender, the receiver may decrypt the message from the sender at step 44. The decryption engine running at the receiver's equipment may use the values of the private key sQ and the parameter rP when decrypting the message.

With identity-based cryptographic schemes such as the approach described in connection with FIGS. 1-4, the sender can obtain the cryptographic public parameters (P and sP) and the receiver's identity (Q) in advance of encrypting and sending the message. This information may be carried with the sender (e.g., on the sender's equipment 12 when the sender's equipment 12 is portable). It is not necessary to have access to each different possible receiver's public key, because the email address (or other identity Q) of each receiver may, in effect, be used as the public encryption information for that receiver and because the public parameter information P and sP may be shared by a large number of potential recipients. The receiver must have access to the private key sQ from the private key generator when the receiver desires to decrypt an encrypted message, but, if necessary, the receiver can obtain the information after the encrypted message has already been received. As a result, the identity-based encryption scheme shifts the burden of obtaining timely encryption information generated by the private key generator 16 from the sender to the receiver. This allows the sender to be off-line (e.g., traveling in an airplane without Internet access) when the sender composes and encrypts a message for the receiver. Even if the sender's equipment is stolen, the encrypted message will be safe. Such a scenario would not generally be possible using a public-key encryption scheme, because the composed message would remain unencrypted until the sender was able to obtain Internet access to look up the receiver's public key.

In public-key encryption systems, there is a general desire to make public keys long-lived, to reduce the effort required during public key lookup procedures. This desire for long-lived public keys is tempered by a frequent desire to have the public keys expire quickly (e.g., to ensure that workers who are no longer with an organization will quickly have their privileges revoked by having their public keys expire).

With identity-based cryptographic schemes, the public parameters P and sP can be fairly long lived. For example, these parameters may expire once per year, rather than once per day in a public-key system. User privileges may still be revoked quickly, by requiring that the receiver's private key be updated frequently (e.g., once per day). This may be accomplished, for example, by concatenating a time stamp (e.g., the current date) with the receiver's email address to form a composite identity Q. Because a receiver's identity Q changes every day with this type of approach, the receiver's private key changes every day. The receiver's ability to receive and decrypt messages is therefore dependent on the private key generator's willingness to dispense new private keys. A given receiver's privileges may be revoked at any point by refusing to generate additional private keys. If desired, the identity-based scheme that is used in system 10 may have additional features, such as security clearance levels, etc.

Identity-based encryption schemes may be computationally intensive. For example, an identity-based encryption scheme may be able to encrypt data at the rate of roughly 1000 bytes/second, whereas a symmetric encryption algorithm such as DES3 may be able to encrypt data at a rate of about 100 Mbytes/second. Accordingly, it may be desirable to use an identity-based encryption scheme to allow the sender and receiver to securely exchange symmetric keys. A symmetric cryptographic algorithm (e.g., DES—Data Encryption Standard) may be used to transfer the desired content between sender and receiver once the symmetric keys have been exchanged. The symmetric key encryption and decryption processes may be incorporated into the same software or platform as the identity-based cryptographic features of the system or may be provided as a separate application or operating system function. These are merely illustrative methods for securely exchanging message content (e.g., commands, data, text messages, etc.) between a sender and receiver in system 10.

Figure 5:
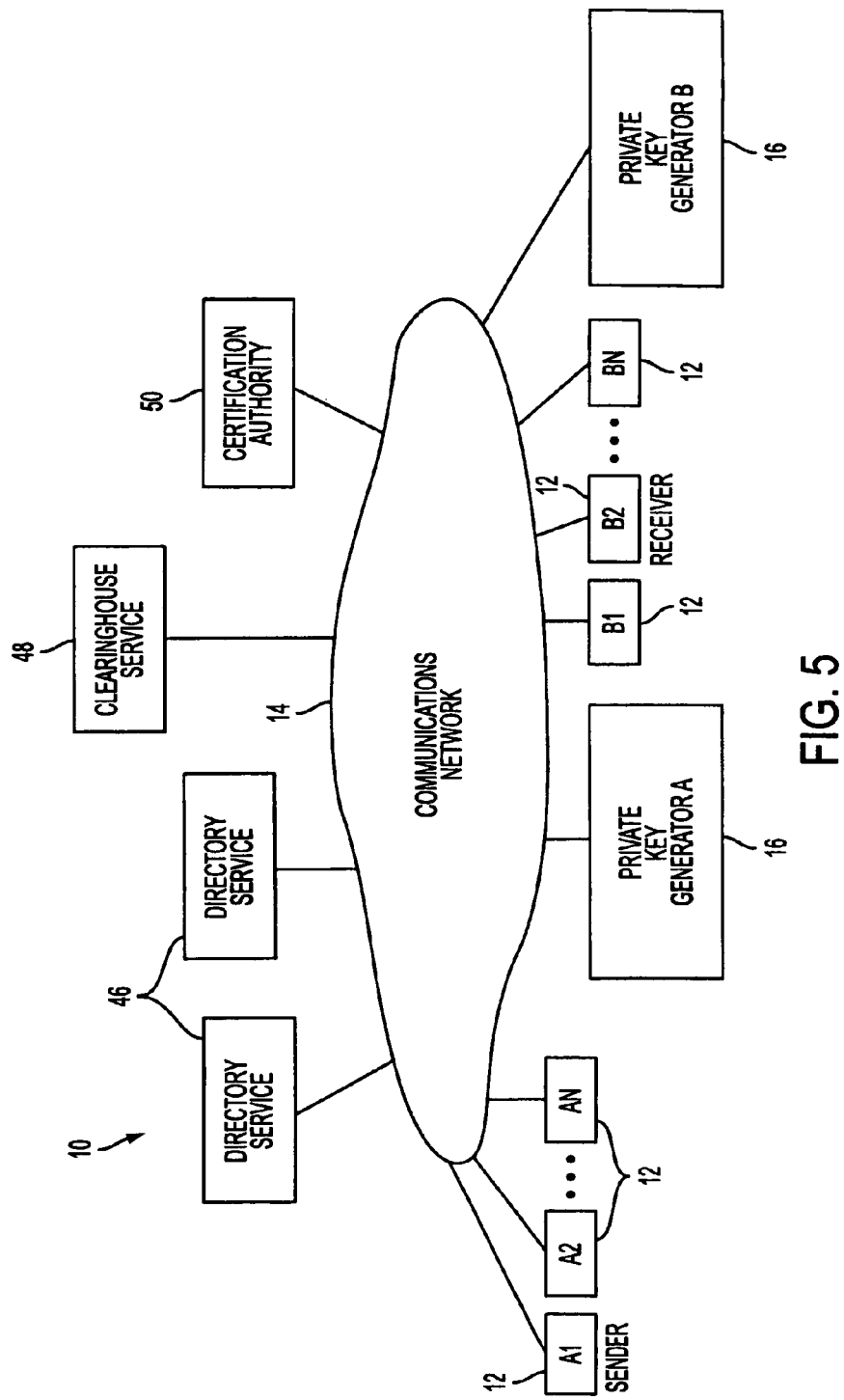
FIG. 5 is a diagram of an illustrative identity-based encryption system having multiple private key generators each associated with a different group of users in accordance with the present invention.

System 10 may have multiple private key generators 16, each with their own master secret. As shown in FIG. 5, users A1, A2, . . . AN may be associated with private key generator A (having a master secret SA) and users B1, B2, . . . BN may be associated with private key generator B (having a master secret $s_B$). With this type of arrangement, organizations need not share a private key generator. A different key generator may be used for each different group of users. The groups of users that are associated with the various key generators may be divided along organizational lines or may be divided according to any other suitable grouping (and may overlap). For example, the group of users associated with one private key generator may include all or many of the users in a particular branch of government, the group of users associated with another private key generator may include all users working at a particular corporation, and the users associated with another private key generator may include substantially all users in a particular country. Users may be associated with another private key generator by virtue of being subscribers to a particular service, whereas still other users may be associated with a private key generator by virtue of having a shared domain name (character string) in their email address, etc. These are merely illustrative ways in which groups of users may be associated with particular private key generators. Any suitable grouping arrangements may be used if desired.

By using multiple private key generators 16 in system 10, different organizations or user groups can each guard their own master secret, without needing to trust third parties or other user groups. This may be important in situations in which secrecy is so important that it cannot be delegated easily (or at all) to others. As just one example, a military organization in one country may be unwilling to trust a private key generator maintained by an organization in a foreign country.

A sender who desires to send an encrypted message to a receiver who is associated with the same private key generator as the sender can use the identity-based encryption engine installed on the sender's equipment 12 to encrypt a message for the receiver using the receiver's identity Q and the public parameters P and sP that are available from the sender's and receiver's common private key generator. If, for example, a user A1 (a sender in this scenario) desires to send an encrypted message to user AN (a receiver in this scenario), sender A1 may obtain the public parameters for receiver AN from a private key generator A that is associated with both sender A1 and receiver AN. A message encrypted by sender A1 using these public parameters (e.g., using $P_A$, $s_A P_A$) may be successfully decrypted by receiver AN using these same public parameters (e.g., using $P_A$, $s_A P_A$) and using AN's private key $s_A Q_{AN}$ (generated by private key generator A using master secret $s_A$). (Use of the random number r is not addressed in this portion of the discussion for clarity.)

If, however, the sender (e.g., sender A1) is associated with private key generator A, whereas the receiver (e.g., receiver B2) is associated with private key generator B (having a master secret $s_B$), sender A1 must use the public parameters associated with private key generator B ($P_B$, $s_B P_B$) to encrypt a message destined for receiver B2. If A1 uses the wrong public parameters (e.g., if A1 uses the public parameters $P_A$, $s_A P_A$ that are associated with private key generator A), receiver B2 will not be able to properly decrypt the message.

This is because receiver B2's private key $s_B Q_{B2}$ is generated using the master secret $s_B$ that is associated with the private key generator B, not the master secret $s_A$ that is associated with the private key generator A.

Accordingly, the public parameters for all private key generators 16 are preferably published. This may be accomplished in system 10 by using directory services 46 to make the public parameters of various organizations or user groups publicly available to all users. Directory services 46 may be implemented, for example, by using directory servers connected to communications network 14 to host directories. If desired, the computers of the Internet Domain Name System (DNS) may be used to host public parameters and other directory information. The Domain Name System is a distributed Internet directory service that is mainly used to translate or map between symbolic domain names (e.g., "user@stanford.edu") and numeric IP addresses (e.g., "171.64.64.64"). If the computers (servers) of the Domain Name System or service are used to implement directory services (e.g., to provide public parameter directory information to users), the DNS entries may include the appropriate public parameters for each domain name entry in addition to the numeric IP address information.

There may be one or more directory services and servers. Each directory service 46 may contain the same public parameter information, so that a given user need not look up directory information in different locations or with different services (or at least not many). The locations of the directory services (e.g., their URL's) may be provided to users as part of each user's identity-based encryption software, may be provided to the users separately, may be provided to the users using a combination of these techniques or any other suitable technique. The identity-based encryption software may be distributed to the user as part of equipment 12, may be downloaded as a stand-alone application or a plug-in, etc. Once the public parameter information has been obtained, it may be cached locally (e.g., in memory on the user's equipment 12), until it is time to update this information (e.g., to reach a user at a newly-registered private key generator).

In one illustrative arrangement, directory services may be provided by a trusted organization or organizations. With this type of arrangement, each user who is accessing directory information may, because they trust the directory service, set up a secure communications channel with the directory service (e.g., using a secure key exchange arrangement as used with the secure sockets layer protocol, etc.). Once the secure communications channel has been established between the user and the trusted directory service, the user may provide the directory service with information identifying an organization or group for which the user desires public parameter information. The directory service may use this identifying information to determine which public parameter information to provide the user. The appropriate public parameter information may then be provided to the user over the secure communications channel.

With this approach, the directory service in effect performs a table look-up operation using the identifying information for the recipient's organization (which may be based on the recipient's email address) as an input. The resulting output of the lookup operation is the public parameters of the organization's private key generator. The directory that associates public parameters with groups of users may be implemented using any suitable arrangement. For example, the directory may be implemented using a database or table of domain names (or partial domain names or email addresses) and associated public parameters. As just one example, if all users with an email address *@*.stanford.edu (where * represents any allowable character string) are part of the same organization and if that organization is associated with a private key generator T, the directory table may include an entry that maps the subset of possible identities "*@*.stanford.edu" to the associated public parameters $P_T$, $s_T P_T$ that are associated with that private key generator. Any suitable database or data structure arrangement may be used by the directory service or services 46 to maintain the directory information.

The directory information for the directory services 46 may be provided by the private key generators 16. A clearinghouse 48 may be used as an intermediary between the private key generators 16 and the directory services 46 to avoid duplication (e.g., conflicting table entries).

If the directory services are not trusted (e.g., because they are operated by relatively unknown third parties), a certificate authority 50 may be used to sign directory entries from the private key generators 16. The directory entries may be signed by the certificate authority using standard cryptographic signing techniques. With this approach, the certificate authority, rather than the directory services 46 or clearinghouse service 48 is responsible for authenticating the private key generators 16. The entries may be made to automatically expire (e.g., in a number of years) by adding an expiration date to each entry. This allows the private key generator information at the directory services to be kept up to date.

Figure 7:
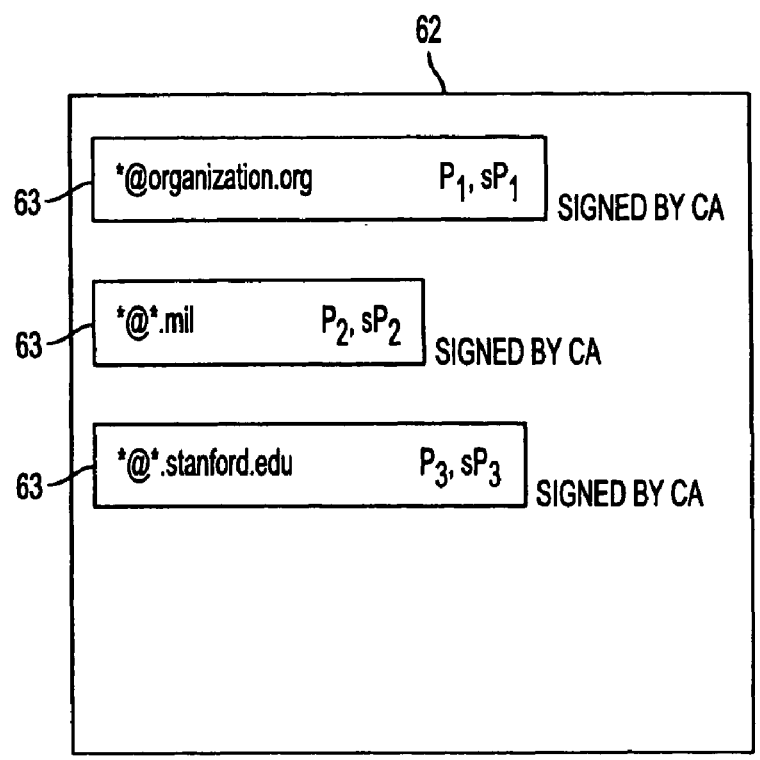
FIG. 7 is a diagram of an illustrative database arrangement that may be used to provide senders with the ability to look up the public parameters for a given message recipient in accordance with the present invention.

Any suitable technique may be used by the certification authority 50 to authenticate the private key generators 16 (e.g., techniques based on pre-shared secrets or certificates, etc.). Once the certificate authority 50 verifies the identity of a given private key generator 16, the certificate authority may generate a (signed) certificate that includes the email/domain name information for the users associated with the given private key generator and the corresponding public parameters. An illustrative table 62 that includes a number of signed directory entries 63 is shown in FIG. 7.

When there are multiple directory services 46 in system 10, the signed directory entries (certificates) may be processed by clearinghouse service 48 to avoid duplicate entries in the resulting directory tables maintained by directory services 46.

When a sender associated with private key generator A desires to send a message to a receiver associated with private key generator B, the sender may obtain the appropriate public parameters for the receiver's organization (and therefore for the receiver) from one of the directory services 46 (if the sender or equipment on the sender's local network has not already obtained the parameters and locally cached them). If the directory services are trusted, the sender may set up a secure communications channel with a directory service over network 14 to obtain the public parameters. If the directory services are not inherently trusted, the sender may obtained a signed certificate from a directory service 46 over network 14. The certification authority signs the certificate using the private key of the certification authority. The sender may then verify the signature on the certificate using the certification authority's public key. The public key of the certification authority may be built in to the user software, may be accessed on-line by the user software, or may otherwise be provided to the users of the system. If desired, certificates may be chained together, so that multiple layers of certifying organizations can certify in a hierarchical fashion. Either of these two approaches (obtaining the public parameters from a trusted directory service over a secure or trusted channel or obtaining the public parameters from an untrusted directory service in the form of a certificate signed by a certification authority) or any other suitable approach may be used to ensure that the public parameters that the sender receives are in fact those associated with the intended organization/receiver.

Figure 6:
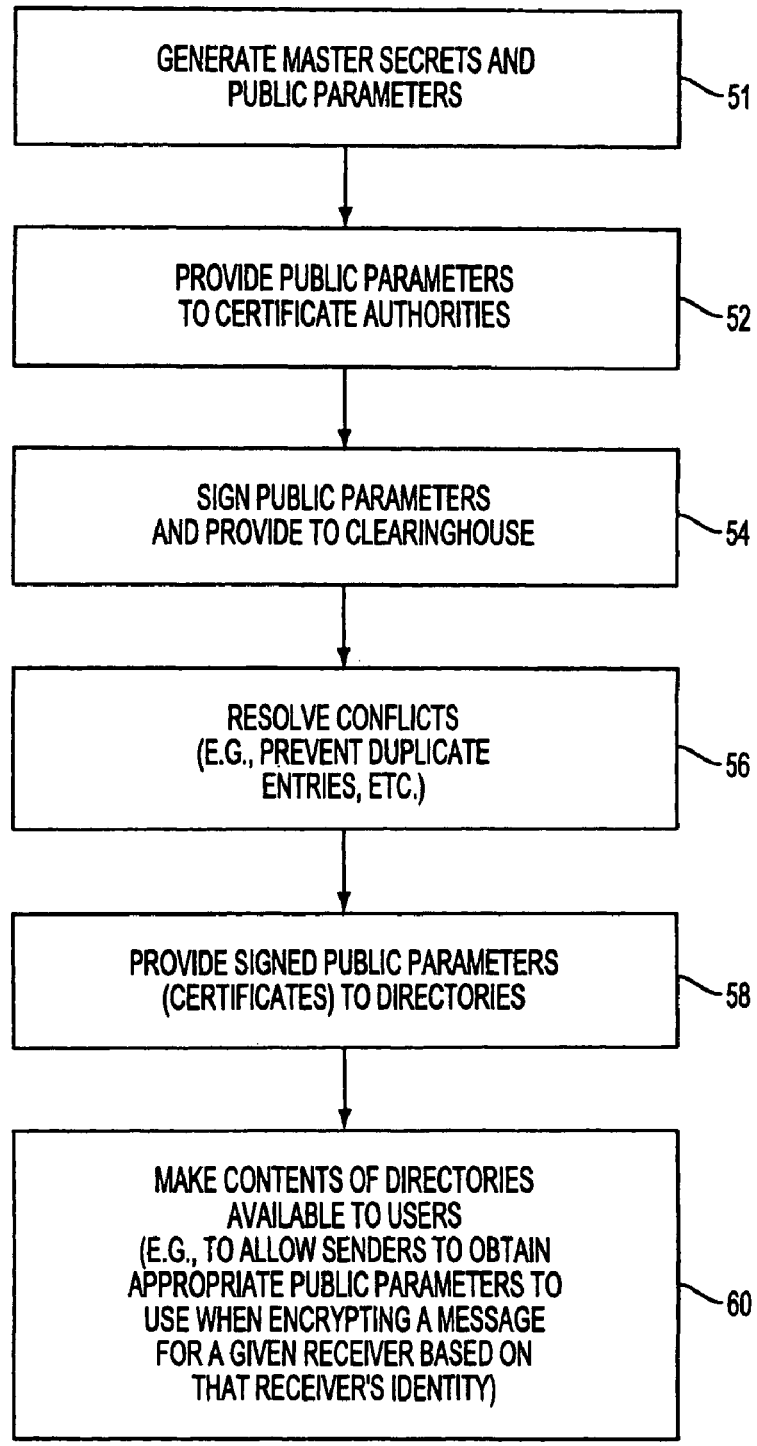
FIG. 6 is a flow chart of illustrative steps involved in providing appropriate public parameter information to a sender to allow the sender to send an encrypted message to a given receiver in accordance with the present invention.

Illustrative steps involved in using an identity-based cryptographic system with one or more directory services are shown in FIG. 6. At step 51, the private key generators for each group of users generate their master secrets s and corresponding public parameters P and sP. If the directory services 46 are trusted, the public parameters and the information on which users those public parameters correspond to may be provided to the directory servers without use of the certification authority. If the directory services 46 are not trusted, this information may provided to the directory services by way of a certification authority 50 that signs the directory entries (steps 52 and 54).

One or more directory services 46 may be used. In system configurations in which there are multiple directory services, there is a potential that the directory maintained by one directory service will not agree with the directory maintained by another directory service. For example, one directory may inform users that the email addresses *@company.com are associated with company 1, whereas another directory may inform users that the email addresses *@company.com are associated with company 2. These types of conflicts can be resolved and/or prevented at step 56 using any suitable scheme.

For example, the directory services 46 may periodically negotiate with each other to resolve conflicts or they may use a common housekeeping program to resolve conflicts. With one suitable arrangement, system 10 has a clearinghouse service 48 through which all (or most) directory information must pass on its way to the directory services 46. When this arrangement is used, each private key generator may pass its directory information directly to the clearinghouse service 48 (if no certification authority is used) or may pass its directory information to the clearinghouse service 48 through an appropriate certification authority 50. The clearinghouse service 48 (which may be operated by a trusted service provider or which may be located at a directory service, certification authority, or private key generator) may ensure that there are no errors in the directory information before allowing the directory services to make the directory information publicly available. For example, the clearinghouse service may query each of the directory service databases to ensure that there are no presently existing database entries that would conflict with the new directory information before allowing the directory information to be accepted.

It may be desired to replace, merge, split, delete, add, or otherwise modify directory entries during operation of the system. For example, if the master secret of a private key generator has been compromised, a new master secret and corresponding set of public parameters may be generated and provided to the clearinghouse service (steps 51, 52, and 54). This new public parameter information may be properly associated with the correct directory entries by the clearinghouse at step 56. As another example, an organizational change may cause a domain name to be subdivided into multiple subdomains, each of which should have its own entry with a corresponding unique set of public parameters. Domain name changes may also lead one to add entries to map additional users to an existing set of public parameters. If an organization or private key generator ceases operation, directory entries can be removed. Directory maintenance operations such as these may be handled by the clearinghouse service 48 (e.g., during step 56).

After potential conflicts have been resolved and maintenance operations performed at step 56, the directory information may be provided to the directory services 46 for publication to the users at step 58. (This step and the other steps of FIG. 6 may be repeated periodically during operation of the system). If the directory entries have been signed by a certificate authority, the directory entries may be provided in the form of certificates. If no certificate authority is being used, directory information is preferably conveyed to trusted directory services using a secure communications channel or other secure mechanism.

At step 60, the directory services 46 may make the directory information available to users of the system. By making the directory of user/organizational identity information (e.g., email address domain information) and associated public parameter sets available to the users, a sender may use the directory services to look up or otherwise determine the appropriate set of public parameters to use when encrypting a message for a given receiver or organization. The identity of the given receiver or the receiver's organization can be used when performing the look up operation. For example, the directory service that the sender contacts, can compare the given receiver's email address or the receiver's organization's domain name to the email address domains in the directory (e.g., as shown in FIG. 7) until a suitable match is found. The associated public parameters for that receiver's organization's private key generator may then be provided to the sender.

Figure 8:
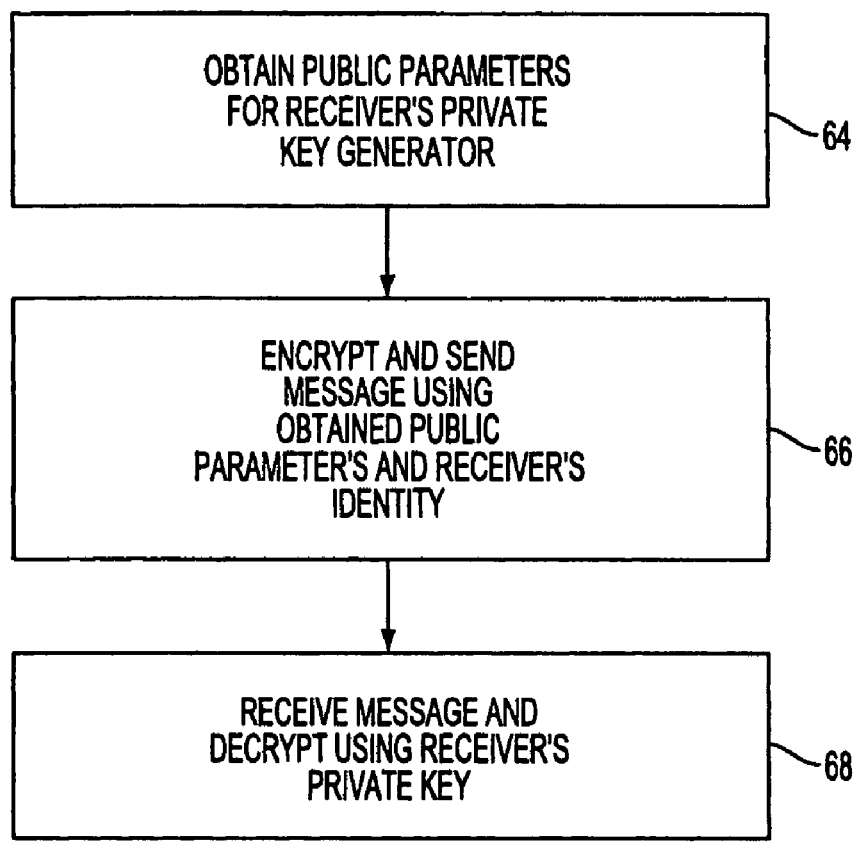
FIG. 8 is a flow chart of illustrative steps involved in using the system of FIG. 5 to provide the public parameters to the sender and using those public parameters to encrypt and decrypt a message in accordance with the present invention.

A flow chart of illustrative steps involved in using the identity-based cryptographic system 10 of FIG. 5 to send encrypted messages from a sender to a receiver are shown in FIG. 8. At step 64, a sender may obtain appropriate public parameters to perform identity-based encryption on a message for a given receiver. Information on the appropriate public parameters to use for a given receiver may be maintained on a local database or on a remote database accessed over a communications network such as the Internet. Information on the appropriate public parameters may also be delivered to users in the form of a disk, using email delivery, etc. Use of a directory on the Internet may be suitable when senders have reliable Internet access.

During step 64, the sender's equipment 12 may, for example, check to see if the receiver is associated with the same private key generator as the sender. If the sender and receiver share a private key generator (e.g., because the sender and receiver work for the same company or are otherwise commonly associated with the same user group), the sender may encrypt a message for the receiver using the sender and receiver's common public parameters (and using the receiver's identity). The receiver may decrypt the message from the sender using these public parameter's (and the receiver's private key). Information on whether the sender and receiver are associated with the same private key generator may be maintained locally (e.g., on a local area network accessible by the sender) or may be maintained by directory services 46.

If the receiver is not associated with the same private key generator as the sender, the sender may obtain the appropriate public parameters for the receiver from a suitable directory service 46 (e.g., a directory service located in the same country as the sender, in the same network as the sender, or, if desired, at a more distant location). The equipment at the directory service may be used to compare a given receiver's identity information or the recipient's organization's domain name information to the information in the directory. This allows the receiver's identity or the identity of a desired recipient organization to be used to look up the appropriate published public parameters to use for that particular receiver. Even if the system has multiple private key generators, senders can encrypt messages for receivers using the correct public parameters. The public parameter information may be stored by the sender (e.g., locally on the sender's equipment), so that the sender can reuse this information the next time that the sender desires to send an encrypted message to a receiver in the same organization or user group.

After having obtained the public parameters of the receiver (e.g., by downloading this information over communications network 14 or retrieving it from local storage), the sender may encrypt the message for the receiver at step 66 using the identity-based encryption scheme. The receiver may decrypt the message from the sender at step 68. Any suitable identity-based encryption scheme may be used, as described in connection with FIGS. 1-4.

If desired, the public parameters may be distributed between users in the system 10. This type of peer-to-peer arrangement may be used, for example, when a sender contacts a receiver by email and requests the receiver's public parameters. The private key generators 16 can generate and distribute the public parameters of the users to the users over trusted channels or any other suitable distribution channels. Once receivers obtain their public parameter information, the receivers can provide this information to the senders. For example, a receiver may provide a sender with the public parameters for the receiver's organization when the sender requests these public parameters from the receiver using a text message (e.g., an email message) or a computer-generated message (e.g., a request that is automatically sent to the receiver by the sender's equipment as the sender prepares to encrypt and send a message to the receiver). The receiver's response to a manually-generated or automatically-generated message may be manual or automatic. Automatic operations may be supported, e.g., by software installed on the user equipment. In one suitable arrangement, a set-up message that is automatically-generated as the sender prepares to send the main message is automatically received and responded to by the receiver's equipment without the receiver's manual intervention (or with minimal intervention). This automatic response message contains the public parameters of the private key generator associated with the receiver. The sender's equipment automatically uses the public parameter information from the receiver in encrypting the main message. Receivers and organizations can also publish their public parameters on a personal or corporate web site or on any other suitable publicly available server or equipment coupled to communications network 14, even if such equipment is not a full-fledged directory service. Senders may use these public parameters if they trust the receiver's or organization's web site. A trusted communications path may be used to obtain the public parameters from this type of source. If desired, the receiver or organization may use the services of a certification authority to verify the receiver's or organization's identity and to produce a certificate that includes the receiver's and organization's public parameters, prior to providing these public parameters to senders via email messages or other peer-to-peer communications or via the Internet.

If desired, lists of public parameters (e.g. portions of the directories or entire directories) may be distributed to users according to a schedule. For example, directory services may distribute the public parameter directory to certain users using an email mailing list or other suitable distribution scheme. The directory information may be distributed, for example, during an off-peak time, when network usage is relatively low. The directory information may, if desired, be distributed in the form of updates. For example, users who have already been provided with a copy of the directory may obtain updated entries (e.g., on demand from the user or according to a predetermined schedule, etc.).

Some or all of the private key generators may generate time-sensitive private keys. Time sensitive keys may be produced, for example, that automatically expire after a predetermined amount of time (e.g., after a day or a week). With this type of approach, users who are no longer authorized to decrypt their incoming messages can be prevented from receiving their current (updated) time-sensitive private key. After the expiration of their old private key, they will no longer be able to decrypt further messages. An advantage of "expiring" user privileges in this way in an identity-based encryption environment is that it is not necessary to frequently update and transmit large lists of new public keys to senders (as would be required if one wanted to make public key information readily available to users in this way in a public-key encryption system).

Users whose private keys automatically expire need to update them on a regular basis to decrypt messages. In one illustrative scenario, a user may be associated with a private key generator at an organization whose private keys automatically expire once each week. Once each week, that user may automatically or manually obtain an updated version of the user's private key from the private key generator. The user's private key generator may also be used to host directory information for the public parameters of other users (e.g., the public parameters for all groups of users that have registered or gone live in the last week). The directory information may be maintained using any suitable format, such as the format shown and described in connection with FIG. 7.

The public parameter information that is hosted by the user's private key generator may be provided to the private key generator from other private key generators, a directory service, a clearinghouse, or any other suitable service. Because the user typically must connect to the user's private key generator once each week anyway to obtain the user's updated private key (in this illustrative scenario), it may be advantageous to provide the user with information on the public parameters of the other private key generators at the same time that the user obtains the user's current private key (or during the same transaction). The user's local equipment 12 or equipment at the user's local private key generator 16 (or elsewhere in the user's local network, etc.) may be used in determining which public parameters to use to properly encrypt a message for a given receiver. The local private key generator may, for example, perform a look-up operation based on the identity of the given receiver or receiver's organization upon request by the sender. Alternatively, the contents of the directory may be provided to the sender (e.g., by transferring a copy to the sender's local equipment or by allowing the sender's local equipment to access this information over a local network or other communications path) so that the sender's equipment can determine which public parameters should be used.

Figure 9:
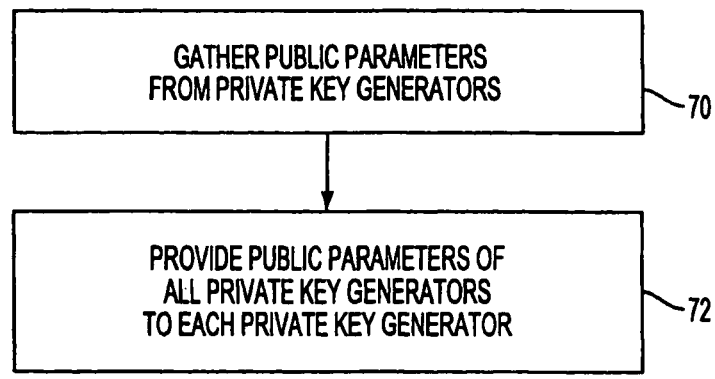
FIG. 9 is a flow chart of illustrative steps involved in using a clearinghouse service or other service to gather and distribute public parameters in accordance with the present invention.
Figure 10:
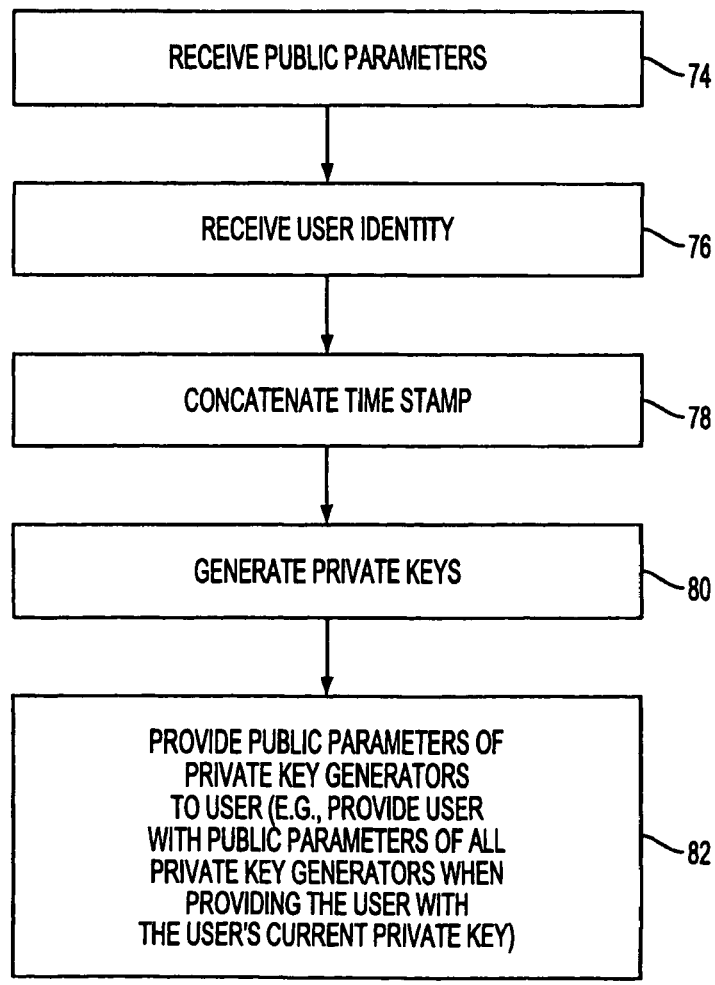
FIG. 10 is a flow chart of illustrative steps involved in generating time-sensitive private keys and in providing a given user with public parameter information for other users in the system when providing the given user with that user's current time-sensitive private key in accordance with the present invention.

Illustrative steps involved in using private key generators to distribute and maintain public parameter information are shown in FIGS. 9 and 10. As shown in FIG. 9, the public parameter information for the private key generators in the system may be gathered from the private key generators at step 70. The public parameter information may, for example, be gathered by a centralized entity such as clearinghouse service 48. The clearinghouse service 48 may poll each private key generator for this information or the private key generators may provide the information to the clearinghouse at their initiative or according to a schedule. Directory services 46 need not be used to house the directory information. Rather, the clearinghouse service 48 may distribute the public parameter information that has been gathered to each of the private key generators 16 (step 72). Each private key generator may be provided with information on the public parameters of all (or some or substantially all) of the other private key generators in the system.

The public parameter information may be provided in the form of a table such as the table of FIG. 7 or other format for mapping the groups of users to respective private key generators. As an example, the public parameter information that is gathered and distributed in the process of FIG. 9 may be accompanied by information that maps domains or other portions of email namespace (e.g., that space made up of all possible email addresses) to particular private key generators. The mapping need not be unique. For example, one user may belong to multiple domains. In using such overlapping directory information, the more specific mapping information, e.g., the longer or more specific domain, may be used first and, if that lookup operation fails, the less specific mapping information, e.g., the shorter or less specific domain, may be used as a fallback.

After the public parameter information from the private key generators has been collected from each of the private key generators at step 70 and this collection of public parameter information has been provided back to each of the private key generators at step 72, the private key generators may make this information available to their associated users. Steps involved in this process are shown in FIG. 10.

At step 74 of FIG. 10, each of the private key generators 16 may receive the public parameter and email domain mapping information from the clearinghouse 48 (e.g., as the parameters are provided during step 72 of FIG. 9). This step may be repeated periodically as new private key generators are added or removed. The clearinghouse 48 may provide this information in the form of a stand-alone file or list or as an update transmission over communications network 14. A secure communications path may be used between the clearinghouse and each of the private key generators. If desired, the certification authority 50 may sign the public parameter information (and the accompanying domain information specifying which users and organizations are associated with each set of public parameters).

At step 76, the private key generators 16 may receive user identity information Q from a user (if this information had not already been provided to or obtained by the private key generator). On a periodic basis, the private key generator 16 may add a new time stamp to the user's identity (e.g., by concatenating a time stamp such as the current week's date with the user's identity Q). The identity with the concatenated time stamp may be processed by the private key generator using identity-based encryption algorithms and using the master secret s of the private key generator to generate the current private key of the user at step 80. (This process may be repeated in discrete steps or as part of a batch process to produce private keys for some or all of the users associated with the private key generator).

Because the user's operating environment uses time-sensitive private keys (in this example), the user must periodically obtain an updated private key from the private key generator. This provides the private key generator with a suitable opportunity to distribute the directory information mapping users and organizations (by domain name or other suitable scheme) to the public parameters of the other private key generators in the system. Accordingly, the private key generator may provide the public parameters of each of the private key generators (or substantially all of the private key generators or at least some of the private key generators or at least the appropriate public parameters to use for a given receiver or group of receivers or organization) to the user at step 82. This information may be provided to the user from the user's private key generator over a local area network to which the user and the user's private key generator are connected.

The public parameter directory information may be distributed to the user at the same time that the user's new private key is distributed, as part of the same transaction, at slightly different times (e.g., in related but separate messages or transmissions), or at different times in different communications and as part of separate transactions. The distribution of the public parameter directory information may, with this approach, be distributed by pushing the information from each of the private key generators to each other private key generator and ultimately to the users through their interactions with their associated private key generators. This example is merely illustrative.

If desired, a private key generator may be used to provide a global identity-based encryption capability. For example, a special "global" private key generator 16 may be used that has a global master secret and global public parameters. A sender (e.g., a sender A1 that is associated with private key generator A) may use the global public parameters to encrypt a message for a receiver (e.g., a receiver B1 that is associated with private key generator B). The global public parameters may just be used to set up secure communications between the sender and receiver or may be used for all communications (e.g., all communications between users associated with different private key generators).

Figure 11:
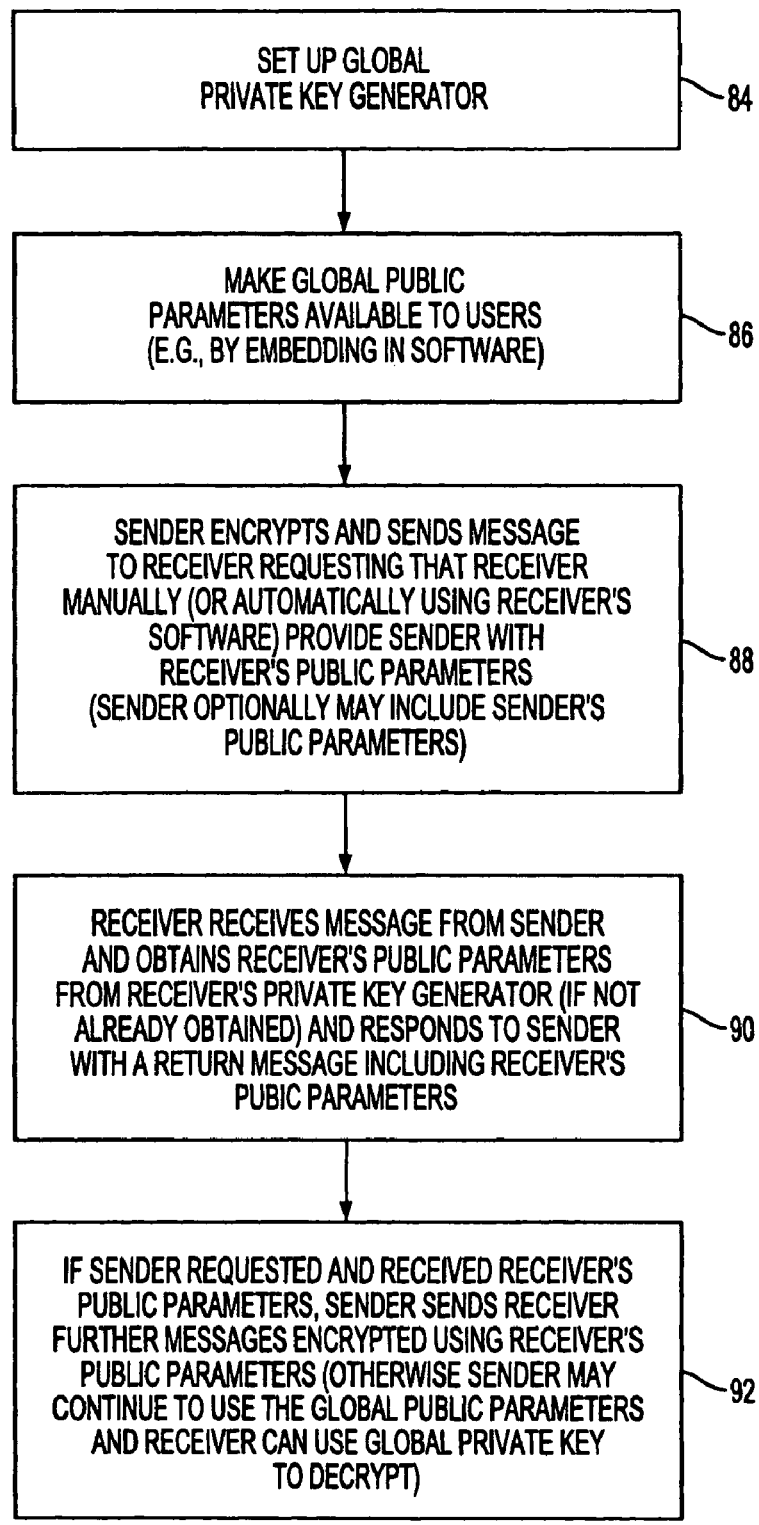
FIG. 11 is a flow chart of steps involved in using a global private key generator scheme to support identity-based encrypted communications in accordance with the present invention.

Illustrative steps involved in using a system with a global private key generation capability are shown in FIG. 11. At step 84, a global private key generator may be set up. For example, a global master secret and global public parameters may be generated. The private key generator may be part of clearinghouse service 48 or may be independently connected to communications network 14.

At step 86, the global public parameters of the global private key generator may be made available to the users. For example, the global public parameters may be embedded in user software (e.g., email messaging software) or may be made available for downloading as a stand-alone application or plug in.

At step 88, a sender may use the global public parameters to encrypt and send a message to a receiver. The sender and receiver may be associated with the same private key generator, but more generally, are associated with different private key generators. Because of the presence of the global public parameters at the sender's location, the sender may encrypt and send a message to the receiver even if the public parameters of the private key generator associated with the receiver are not yet available to the sender (e.g., because the sender is not connected to the communications network 14 and does not have access to a directory service, etc.). If desired, the sender may include the sender's public parameters with the message that the sender is sending to the receiver. This message may or may not include content (e.g., a text message) that the sender desires to transmit to the receiver.

At step 90, the receiver may receive the message from the sender. The receiver may obtain the receiver's public parameters (if they have not already been obtained) from the receiver's private key generator. The receiver may then respond to the sender's message with a message that includes the receiver's public parameters. If the sender provided the sender's public parameters in the sender's message, the receiver may use these public parameters to encrypt communications to the sender.

At step 92, if the sender has requested and received the receiver's public parameters, the sender may use the receiver's public parameters in encrypting and sending further messages (e.g., further messages containing content). If the sender has not requested and received the receiver's public parameters (e.g., because the sender is operating in an environment in which all or many communications between users at different private key generators are routinely handled by using the identity-based encryption capabilities provided using the global public parameters), the sender may encrypt and send further messages using the global public parameters (and the receiver's identity).

If desired, some of the communications between respective entities or components of the system may be made using requests or messages and other communications may be made using a push approach. These approaches may be mixed, or one may be favored over the other. If desired, some of the directory information may be provided using an approach of the type described in connection with FIGS. 9 and 10 (an illustrative arrangement that involves "pushing" the information towards the users), some of the directory information may be provided using peer-to-peer arrangements, and some of the directory information may be provided using the directory look-up approach described in connection with directory services 46.

If desired, any one of these approaches may be used, any two of these approaches may be used, or all three of these approaches may be used. Moreover, in configurations in which system 10 uses more than one of these arrangements for distributing or publishing public parameter information, one approach may be used as a primary approach (e.g., a push arrangement in which directory information is pushed to each user's local network and associated private key generator) and another approach or approaches (e.g., the look-up arrangement based on directory services 46 and/or the peer-to-peer arrangement) may be used as a fallback approach in the event that the primary or more favored approach fails or experiences service degradation.

If desired, the messages sent between the senders and the receivers in system 10 may be email messages or other text messages. The messages may include graphics, audio, video, data, computer code, commands, or any other suitable media, content, data, or instructions. The messages may include cryptographic keys. For example, the messages may be used to exchange DES symmetric keys. Using the identity-based encryption scheme to exchange keys in this way allows efficient symmetric key encryption techniques to be used to exchange large volumes of encrypted content. This type of two-tiered approach (initially using identity-based encryption protocols to exchange symmetric keys and then using symmetric encryption protocols to exchange larger amounts of data) may be made transparent to the user, by using software to automate the tasks associated with the key exchange and data transfer process. The user need not know whether a one-level or two-tier approach is being used.

The messages may be sent from one person (or organization) to another (with or without manual assistance) or may be generated, sent, and received from device to device autonomously, with little or no active human intervention (e.g., when configuring or operating a communications network). Messages and other information such as the public parameter information and private keys may be provided to appropriate entities and equipment on request (e.g., on-demand by the receiver), according to a schedule, or when certain conditions are met.

The configurations shown and described in connection with FIG. 5 are merely illustrative. If desired, the functions of the directory services, clearinghouse service, certification authority, and private key generators may be combined so that any suitable group of these services or entities may be co-located and/or operated by the same entity (or group of entities). As one example, the clearinghouse service functions may be integrated with the functions of one or more of the private key generators. As another example, the directory service functions may be integrated with one or more of the private key generators or the clearinghouse. As yet another example, the certificate authority services may be combined with the services of the clearinghouse. These are merely illustrative examples, any suitable combination of these services and entities may be used in system 10 if desired. Moreover, the functions of the private key generators and other organizations in FIG. 5 may be subdivided. For example, the functions used in generating private keys and public parameters from a master secret may be split across multiple entities (by subdividing the master secret), so that no one entity alone can generate private keys and public parameters for that master secret. In general, any suitable number of users may be associated with each private key generator and any suitable number of private key generators, directory services, clearinghouses, and certification authorities may be included in system 10.

The user equipment, private key generators, directory services, clearinghouse service, certification authority, and other portions of the system may be based on hardware such as computers or other processor-based equipment. The methods for operating and using this hardware may be implemented by firmware and/or code ("software") that runs on the hardware. The hardware may include fixed and removable computer-readable storage media such as memory, disk drives, etc. on which the software for implementing the features of the system may be stored (permanently and during execution). The software may be used to configure the hardware of the user equipment, private key generators, directory services, clearinghouse service, certification authority, and other portions of the system to perform the functions of the identity-based encryption schemes described in connection with FIGS. 1-10.

The foregoing is merely illustrative of the principles of this invention and various modifications can be made by those skilled in the art without departing from the scope and spirit of the invention.

What is claimed is:

1. A method for using identity-based encryption to support encrypted communications in a system in which users at user equipment communicate over a communications network, wherein the system has a plurality of private key generators and a plurality of respective associated sets of public parameters, wherein each private key generator generates private keys for a group of associated users and wherein each user's private key may be used by that user to decrypt messages for the user that have been encrypted using the user's identity and the set of public parameters associated with the private key generator that generates that user's private key, comprising:
   using computers coupled to the communications network to store the plurality of sets of public parameters; and
   at a sender having user equipment coupled to the communications network, downloading an appropriate one of the stored plurality of sets of the public parameters to use to encrypt a message for a receiver at user equipment coupled to the communications network, wherein the sender is associated with a different private key generator than the receiver.

2. The method defined in claim 1 further comprising using the Internet Domain Name System (DNS) in downloading the appropriate set of public parameters.

3. The method defined in claim 1 wherein the receiver belongs to an organization having an associated domain name, the method further comprising using the domain name in downloading the appropriate set of public parameters.

4. The method defined in claim 1 wherein the receiver belongs to an organization having an associated domain name, the method further comprising using the domain name in determining which of the sets of public parameters to download.

5. The method defined in claim 1 wherein the receiver belongs to an organization having an associated domain name and wherein the receiver has an associated email address, the method further comprising using the email address and the domain name in determining which of the sets of public parameters is appropriate to download to the sender.

6. The method defined in claim 1 further comprising using at least a partial domain name in determining which of the sets of public parameters is appropriate to download to the sender.

7. The method defined in claim 1 further comprising:
   at the sender, using the downloaded set of public parameters to encrypt the message for the receiver.

8. The method defined in claim 1 wherein the receiver's identity includes email address information, the method further comprising:
   at the sender, using the email address information of the receiver and the downloaded set of public parameters to encrypt the message for the receiver.

* * * * *